Figure 1:
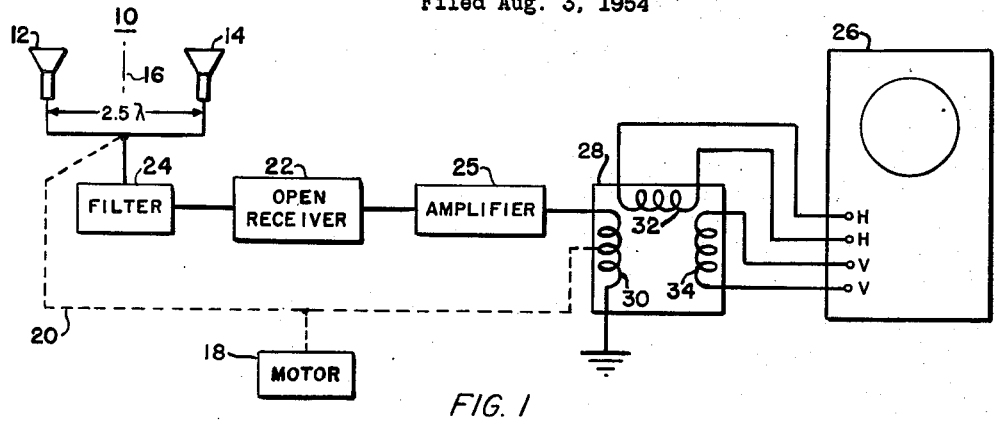

June 24, 1958     A. J. DI GIACOMO     2,840,812

FREQUENCY MEASUREMENT DEVICE

Filed Aug. 3, 1954

INVENTOR,
ANTHONY J. DiGIACOMO.

BY Harry M. Saragovitz

ATTORNEY

United States Patent Office 2,840,812
Patented June 24, 1958

2,840,812
FREQUENCY MEASUREMENT DEVICE

Anthony J. Di Giacomo, West Long Branch, N. J., assignor to the United States of America as represented by the Secretary of the Army Application August 3, 1954, Serial No. 447,683

3 Claims. (Cl. 343—118)

(Granted under Title 35, U. S. Code (1952), sec. 266)

The invention described herein may be manufactured and used by or for the Government for governmental purposes, without the payment of any royalty thereon.

This invention relates to radio frequency measurement devices and more particularly to a method and apparatus for determining the frequency of a transmission source.

In present systems for determining the frequency of a transmission source, the receiver is usually swept through a range of frequencies in synchronism with a calibrated cathode-ray tube sweep during the period that the radio signal is being intercepted. In systems which employ rotating beam receiving antennas for intercepting signals from narrow beam transmitting antennas, the receiver must be tuned to the transmission frequency during the period that the beam from the receiving antennas intercepts the narrow beam from the transmitting antenna. Under such conditions of low probability of intercept, especially for pulse transmissions, coupled with coincidence of receiver frequency scan, the determination of frequency is difficult to achieve.

It is therefore an object of the present invention to provide an improved system for determining the frequency of a transmission source wherein a swept receiver is no longer necessary.

It is another object of the present invention to provide a system for accurately determining the radio frequency of a transmission source having a very narrow beam width.

In accordance with the present invention there is provided an apparatus for determining the frequency of a radio-frequency transmission source including a pair of similarly polarized receiving antennas spaced a predetermined distance apart thereby forming a frequency sensitive array adapted to intercept the signals from the transmission source. Means are included for simultaneously rotating the antennas in a prescribed direction of rotation about a predetermined axis and filter means connected to the combined output of the antennas for limiting the range of frequencies to be detected. Also included are an open receiver responsive to the combined outputs from both of said antennas as they are rotated, a cathode-ray tube line-trace device responsive to the output of the receiver, and means for driving the cathode ray synchronously with the rotation of the antennas for producing a plurality of angularly displaced radial lobes symmetrically arranged about a predetermined reference line which corresponds to the azimuth position of the transmission source. The angular displacement between the reference line and a radial line bisecting any one of the angularly displaced lobes is a measure of the frequency of the transmission source.

Figure 2:
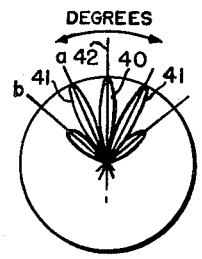
Figure 3:
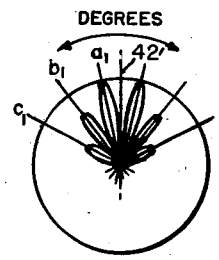
Figure 4:
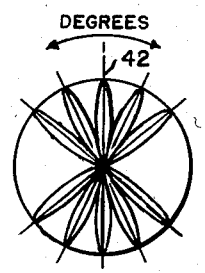
Figure 5:
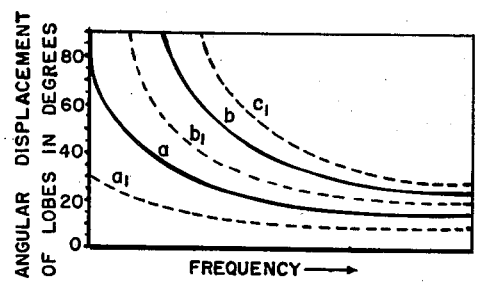

For a better understanding of the invention, together with other and further objects thereof, reference is had to the following description taken in connection with the accompanying drawing in which:

Figure 1 is a block diagram of a radio-frequency determining device in accordance with the present invention;

Figures 2, 3, and 4 illustrate lobe pattern suitable for determining the frequency of a transmitting source within a prescribed range of frequencies, and Figure 5 is a calibration curve utilized in determining the frequency.

Referring now to Figure 1 of the drawing, at 10 there is shown an antenna array comprising a pair of spaced, horn-type receiving antennas 12 and 14 having identical directive patterns in space and each having similar prescribed beam widths. The antennas are maintained in special relationship by any suitable means (not shown) and are rotatably driven about a predetermined axis 16 by a motor 18 mechanically coupled to the antenna array 10 as indicated by the broken line 20. Antennas 12 and 14 are identical in construction, identically polarized and symmetrically arranged with respect to axis 16. The antennas are designed to intercept signals within a predetermined frequency range and the outputs thereof are combined in a predetermined phase relationship, preferably either in-phase or out-of-phase, that is, additively or differentially connected, by any suitable means well known in the art. For effective operation, the antennas are spaced apart greater than ¼ wavelength of the lowest frequency to be intercepted and it has been empirically determined that improved readability and thereby a higher degree of accuracy in determining the frequency of the received signals may be obtained when the antennas are spaced several wavelengths apart.

The combined signal output from antenna array 10 is applied to a wide open receiver 22 through band-pass filter 24. The term "wide open receiver" refers to a wide band-pass, unswept, receiver adapted to receive and detect all signals within a predetermined frequency range, the limits of which are determined by the parameters of band-pass filter 24, and the antenna array 10. The output from receiver 22 is applied to a cathode-ray tube line-tracing device through amplifier 25 and through a two-phase synchronous resolver circuit 28. The construction of such cathode-ray tube device is well known and any further description thereof is not believed necessary. Cathode-ray tube line-tracing device 26 is provided with conventional horizontal and vertical beam deflecting means designated as H, H and V, V respectively. Resolver 28 includes a rotor winding 30 and two stator windings 32 and 34 oriented at right angles to one another. The output of amplifier 25 is applied to rotor winding 30, the output of which is coupled to the orthogonally positioned stator winding 32 and 34. The output of stator winding 32 of the resolver is applied to the horizontal deflecting plates H, H of the cathode-ray line-tracing device 26 preferably through a pair of push-pull arranged amplifiers, and the output of the other stator winding 34 is applied to vertical deflection plates V, V, also preferably through a pair of push-pull amplifiers. With such an arrangement, the resulting cathode-ray line-trace is a radius vector of the signal voltage detected by receiver 22 which rotates about the center of the cathode-ray tube device in synchronism with antenna array 10. It is to be understood, of course, that any other suitable sweep scan control device may be utilized to achieve the aforementioned line trace. As the cathode-ray trace rotates in synchronism with antenna array 10, the configuration of the pattern displayed on a cathode-ray line-trace device 26 will depend upon the frequency of the signal being intercepted.

In order to properly determine the frequency of a transmitting source, it is first necessary to draw up a calibration curve showing the relationship between frequency and the angular displacement between a prescribed reference line and predetermined lobes in the pattern configuration. This is accomplished by placing a variable frequency generator in a given azimuth position with respect to the axis of the antenna array, selecting various frequencies within the operating range of the system, rotating the antennas, and, for each selected frequency, plotting the angular displacement between a prescribed reference line designating the given azimuth position and each lobe forming the pattern configuration within the prescribed frequency range. Figures 2 and 3 are illustrative of the type of pattern configurations for the directional horn-type antennas of Fig. 1 appearing on the screen of cathode-ray line-tracing device 26 for the in-phase and out-of-phase antenna connections, respectively, as the antennas are rotated. The number and relative azimuth position of the lobes appearing in the pattern is a function of the spacing between the antennas and the frequency of the radio signal being intercepted, and it has been found that suitable pattern indications are obtained when the spacing between the antennas is approximately 2½ wavelengths at the lowest frequency to be intercepted. For additively connected antennas the reference line, which may be provided by an overlay on the screen of the cathode-ray device, is positioned to bisect the center reference lobe as shown in Figure 2 wherein the center lobe 40 indicates the relative azimuth position of the transmission source and 42 represents the reference line. The azimuth position of the side lobes such as 41 with respect to center lobe 40 is a function of antenna spacing and frequency. The position of center reference lobe 40 is independent of the frequency of the intercepted signal and is determined only by the azimuth angle of arrival of the signal whereas the side lobes change in number and in angular position with respect to the reference lobe in accordance with the frequency of the incoming signal. Where the antennas are differentially connected, the configuration pattern of Fig. 3 will appear on the cathode-ray line-trace device 26. In this case, 42' is the reference line indicating the azimuth position of the transmission source and it bisects the center null as shown. The dotted curves in Figure 5 illustrate a plot of frequency versus the angular displacement between the reference line 42' and the lobes $a_1$, $b_1$, $c_1$, respectively, of Fig. 3 while the solid curves in Figure 5 illustrate a plot of frequency versus angular displacement between reference line 42 and lobes $a$ and $b$, respectively, of Figure 2.

In actual operation, once the calibration curve has been drawn, the angular displacement between the reference line and an adjacent lobe is read on a suitable calibrated scale surrounding the screen of the cathode-ray line device 26 and the frequency of the signal is determined from the curves of Figure 5. At the high frequencies it may be necessary to utilize other side lobes rather than the lobe adjacent to the reference line in order to obtain a more accurate reading of the frequency. For example, if a suitable reading cannot be obtained from lobe $a$ in Figure 2, then the angular displacement between reference line 42 and lobe $b$ will provide a more accurate reading of the frequency of the transmitted source.

Figure 4 shows the configuration on the screen of the cathode-ray line, tracing device 26, wherein two vertical monopole antennas spaced approximately 2½ wavelengths apart at the lowest frequency range are additively connected. Frequency is determined in the same manner as in Figure 2 or 3.

While there has been described what is at present considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. An apparatus for determining the frequency of a radio-frequency transmission source comprising a pair of similarly polarized receiving antennas spaced a predetermined distance apart and adapted to intercept signals from said transmission source, means for simultaneously rotating said antennas in the same direction of rotation about a predetermined axis, the antennas being connected so that the outputs thereof are combined in a predetermined phase-relationship, means responsive only to a prescribed range of frequencies connected to the output of said antennas, an open receiver responsive to the combined output of both of said antennas for producing demodulated signals corresponding to the intercepted signals as said antennas are rotated, a cathode-ray tube line-trace device responsive to the output of said receiver, and means for driving the cathode ray synchronously with the rotation of the antennas for producing a plurality of angularly displaced radial lobes symmetrically arranged about a predetermined reference line corresponding to the azimuth position of said transmission source with respect to said axis, the angular displacement between said reference line and a radial line bisecting one of said lobes being a measure of the frequency of said transmission source.

2. An apparatus for determining the frequency of a radio-frequency transmission source comprising a pair of similarly polarized receiving antennas spaced from each other a predetermined distance and adapted to intercept signals from the transmission source, means for simultaneously rotating said antennas in a predetermined plane and in the same direction of rotation about a predetermined axis, said antennas being connected so that the outputs thereof are combined in phase opposition, means responsive only to a prescribed range of frequencies connected to the output of said antennas, an open receiver responsive to the combined differential output of said antennas for producing demodulated signals corresponding to the intercepted signals as said antennas are rotated, a cathode-ray tube line-trace device responsive to the output of said receiver, and means for driving the cathode ray synchronously with the rotation of the antennas whereby there is produced a plurality of angularly displaced radial lobes symmetrically arranged with respect to a reference line bisecting the null angle between two centrally disposed lobes, said reference line corresponding to the azimuth position of said transmission source, the angular displacement between said reference line and a radial line bisecting one of said lobes being a measure of the frequency of said source.

3. An apparatus for determining the frequency of a radio-frequency transmission source comprising a pair of similarly polarized receiving antennas spaced from each other a predetermined distance and adapted to intercept signals from said transmission source, means for simultaneously rotating said antennas in a predetermined plane and in the same direction of rotation about a predetermined axis, said antennas being connected so that the outputs thereof are combined additively in-phase, means responsive only to a prescribed range of frequencies connected to the output of said antennas, an open receiver responsive to the combined additive output of said antennas for producing demodulated signals corresponding to the intercepted signals as said antennas are rotated, a cathode-ray tube line-tracing device responsive to the output of said receiver, and means for driving the cathode ray synchronously with the rotation of said antennas whereby there is produced a plurality of angularly displaced radial lobes symmetrically arranged about a center lobe, said center lobe corresponding to the azimuth position of said transmitting source, the angular position of a radial line bisecting said center lobe and a radial line bisecting one of the other of said lobes being a measure of the frequency of said transmission source.

References Cited in the file of this patent

UNITED STATES PATENTS

| | | |
|---|---|---|
| 1,738,522 | Campbell | Dec. 10, 1929 |
| 1,821,386 | Lindenblad | Sept. 1, 1931 |
| 2,419,205 | Feldman | Apr. 22, 1947 |
| 2,563,998 | Foster | Aug. 14, 1951 |